(12) United States Patent
Plocher et al.

(10) Patent No.: US 6,227,509 B1
(45) Date of Patent: May 8, 2001

(54) HOLDER FOR A DRINKS CONTAINER

(75) Inventors: Bernd Plocher, Rottenburg-Seebronn; Friedrich Schanz, Wildberg; Stefan Kuehn, Neubulach; Gerd Lemke, Plienzhausen, all of (DE)

(73) Assignees: Fischerwerke Arthur Fischer GmbH & Co. KG, Waldachtal; DaimlerChrysler AG, Stuttgart, both of (DE)

( * ) Notice: Subject to any disclaimer, the term of this patent is extended or adjusted under 35 U.S.C. 154(b) by 0 days.

(21) Appl. No.: 09/344,892

(22) Filed: Jun. 25, 1999

(30) Foreign Application Priority Data

Jun. 29, 1998 (DE) .............................................. 298 11 572
Sep. 4, 1998 (DE) .............................................. 198 40 386

(51) Int. Cl.⁷ ...................................................... A47K 1/08
(52) U.S. Cl. .................................. 248/311.2; 248/311.3; 248/312; 248/128; 248/132; 248/133; 248/134; 248/136
(58) Field of Search ........................... 248/311.2, 311.3, 248/312, 127, 128, 132, 133, 134, 136

(56) References Cited

U.S. PATENT DOCUMENTS

| | | | |
|---|---|---|---|
| 4,984,722 | * | 1/1991 | Moore .............................. 248/311.2 X |
| 5,280,870 | * | 1/1994 | Chick et al. ....................... 248/311.2 |
| 5,318,266 | * | 6/1994 | Liu ..................................... 248/311.2 |
| 5,601,268 | * | 2/1997 | Dunchock .......................... 248/311.2 |
| 5,603,477 | * | 2/1997 | Deutsch ............................. 248/311.2 |
| 5,671,877 | * | 9/1997 | Yabuya ............................. 248/311.2 |
| 5,997,082 | * | 12/1999 | Vincent et aal. .............. 248/311.2 X |
| 6,047,937 | * | 4/2000 | Huang ............................... 248/311.2 |

* cited by examiner

Primary Examiner—Leslie A. Braun
Assistant Examiner—A. Joseph Wujciak

(57) ABSTRACT

The holder for a drinks container includes a holding arm (16) movable from an initial position into a holding position and formed to hold the drinks container around a circumference of the drinks container, a cover (14) movable from a closed position into an open position and a locking device (32,38) for locking the holding arm (16) in the initial position and for unlocking the holding arm (16) when the cover is moved into the open position. In a preferred embodiment the locking device (32,38) includes a slider member (32), a device for displacing the slider member (32) from a first position to a second position when the cover (14) is opened and a detent lug (38) provided on the holding arm (16) that locks the slider member (32) when the holding arm (16) is in the initial position and that unlocks the slider member (32) when the slider member (32) is displaced from the first position to the second position.

10 Claims, 7 Drawing Sheets

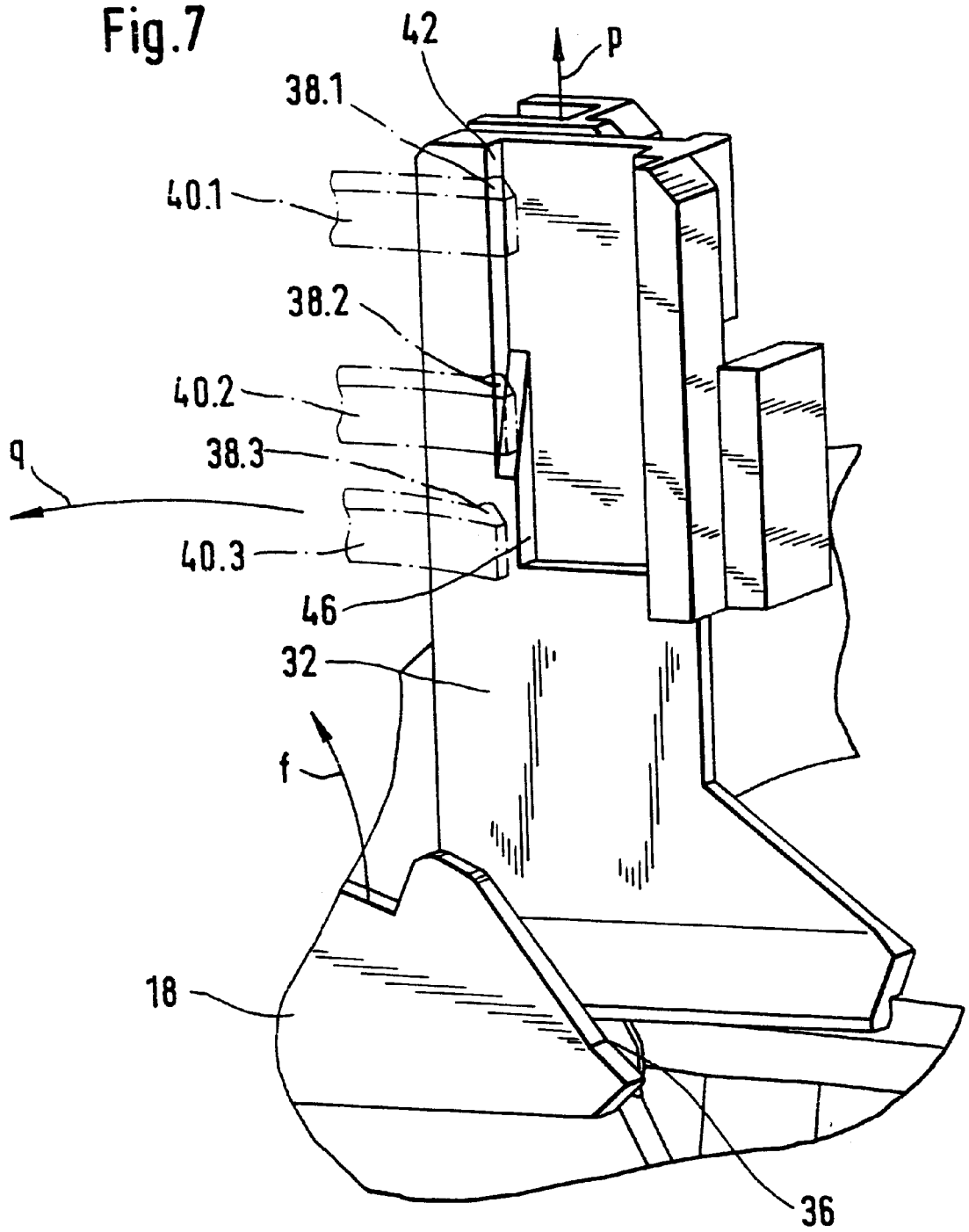

HOLDER FOR A DRINKS CONTAINER

BACKGROUND OF THE INVENTION

1. Field of the Invention

The invention relates to a holder for a drinks container intended for installation in a motor vehicle, for example in a dashboard, having a holding arm which is movable from an initial position into a holding position, the holding arm in its holding position supporting a drinks container inserted in the holder around its circumference, and having a cover movable from a closed to an open position.

2. Prior Art

This type of holder for a drinks container, such as, for example, a cup, a beaker or a drinks can, is known per se. One known holder has, for example, a holding arm which supports a drinks container that is inserted in the holder around its circumference and thus secures it against falling over or falling out of the holder. When not in use, the holding arm can be moved, for example pushed or pivoted, into its initial position.

It is also known to provide the holder with a cover with which the holder, including the holding arm in the initial position, can be covered when not in use.

SUMMARY OF THE INVENTION

It is an object of the present invention to provide a holder of the above described kind which has a device for locking the holding arm in its initial position when the holder is not in use.

This object, and others which will be made more apparent hereinafter, are attained in a holder for a drinks container comprising a holding arm and a cover, wherein the holding arm is movable between an initial position and a holding position, the holding arm in the holding position supports a drinks container around its circumference when the drinks container is inserted in the holder and the cover is movable from a closed position to an open position.

According to the invention the holder has a locking device which locks the holding arm in its initial position and which is unlocked by opening the cover, so that the holding arm is movable into its holding position.

The invention has the advantage that the holding arm is locked in its initial position while the cover is closed, and in particular that rattling noises caused by vibration and jolts during travel are avoided.

In a preferred development of the invention, the cover in its open position provides a rest for supporting a drinks container inserted in the holder. In addition, in one embodiment of the invention, the cover in its open position assumes an approximately horizontal position and is located below the holding arm and spaced from it when the holding arm occupies its holding position. This ensures that an inserted drinks container is held securely. The cover may be constructed in the form of a dish to receive any liquid spilling out of the drinks container. In another embodiment of the invention, the cover is pivotally mounted on the holder. For the purpose of opening the cover, that is moving it from the closed position into the open position, the cover can be pivoted downwards into an approximately horizontal position below the holding arm.

In a preferred embodiment of the invention, the holding arm is constructed in the form of a holding ring which in its holding position surrounds a drinks container inserted in the holder. The holding arm may also be constructed in the form of an incomplete ring which does not surround the entire circumference of a drinks container inserted in the holder.

In a preferred embodiment of the invention the holding arm is mounted on the holder so as to be pivotable upwards for the purpose of moving it from its initial position into the holding position. This has the advantage, especially when the cover is arranged to pivot downwards, that the cover in its closed position covers the holding arm in its initial position and that when the cover is pivoted downwards on opening and the holding arm is pivoted upwards into the holding position, the holding arm and the cover have the vertical spacing necessary for securely holding a drinks container inserted in the holder.

In a preferred embodiment of the invention, the holding arm is moved into the holding position by a spring element. This embodiment of the invention has the advantage that after the cover has been opened the holding arm pivots into the holding position automatically, since opening the cover unlocks the locking device and the holding arm is thus released. The locking device in this embodiment of the invention has the advantage that it locks the holding arm in the initial position when the holding arm is moved from the holding position into the initial position. While the cover is being closed, therefore, the holding arm need not be held against the force of the spring element that presses the holding arm into the holding position after the cover has been opened. Closing and opening the holder according to the invention are simplified as a result.

In various embodiments of the invention, a slider member is provided which locks the holding arm in its initial position. The slider member is displaced from a first position into a second position by opening the cover and in so doing releases the holding arm, so that after the cover has been opened the holding arm can be moved into the holding position and especially moves automatically into the holding position under the action of a spring.

In further embodiments of the invention, the holding arm has a detent lug that cooperates with the slider member. When the holding arm is in its initial position the detent lug engages behind an undercut on the slider member, so that the holding arm is locked in the initial position. Displacement of the slider member from the first position into the second position causes the detent lug to become disengaged from the slider member, with the result that the holding arm is released. In a particularly preferred embodiment of the invention, the slider member has an uncoupling surface which, on displacement of the slider member from the first position into the second position, slides along the detent lug of the holding arm and thus presses the detent lug out of engagement with the slider member, so that the holding arm is released.

BRIEF DESCRIPTION OF THE DRAWING

The objects, features and advantages of the invention will now be illustrated in more detail with the aid of the following description of the preferred embodiments, with reference to the accompanying figures in which:

FIG. 7 is a diagram showing the principle of a locking device of the holder of FIG. 1, viewed in the direction of arrow VII in FIG. 2.

DESCRIPTION OF THE PREFERRED EMBODIMENTS

Figure 1:
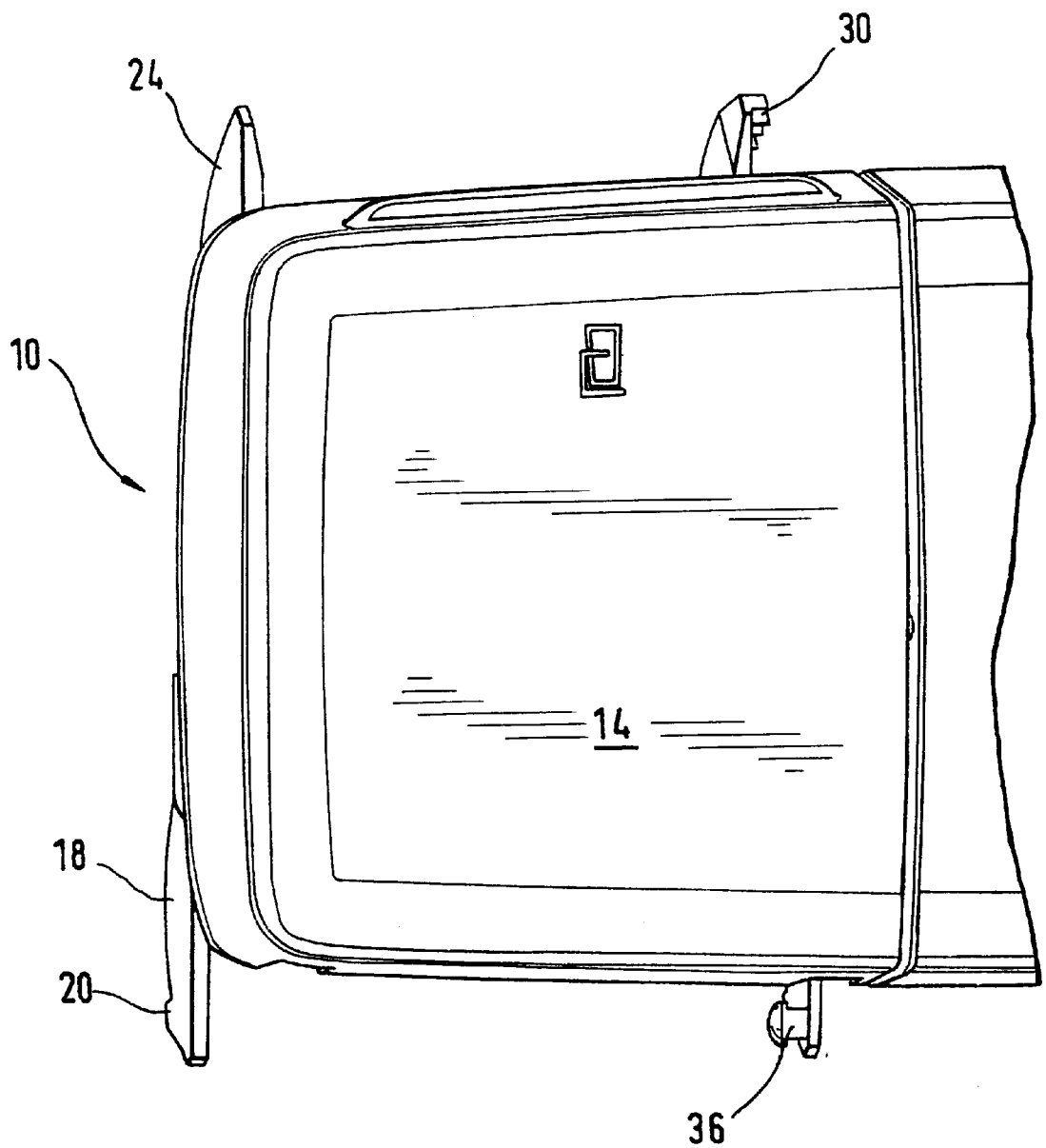
FIG. 1 is a front view of a holder according to the invention in a closed position.
Figure 2:
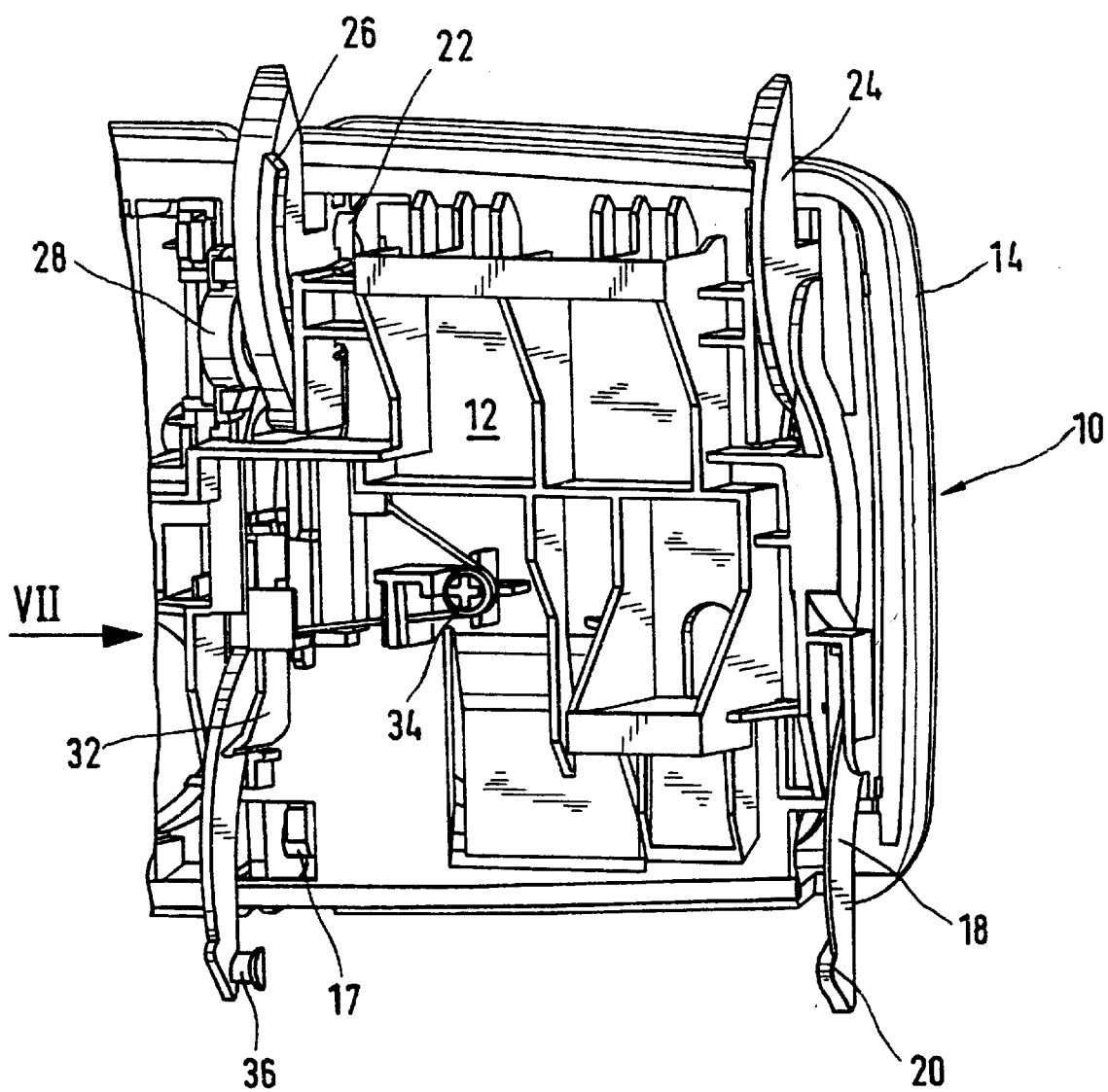
FIG. 2 is a rear view of the holder of FIG. 1 in the closed position.
Figure 3:
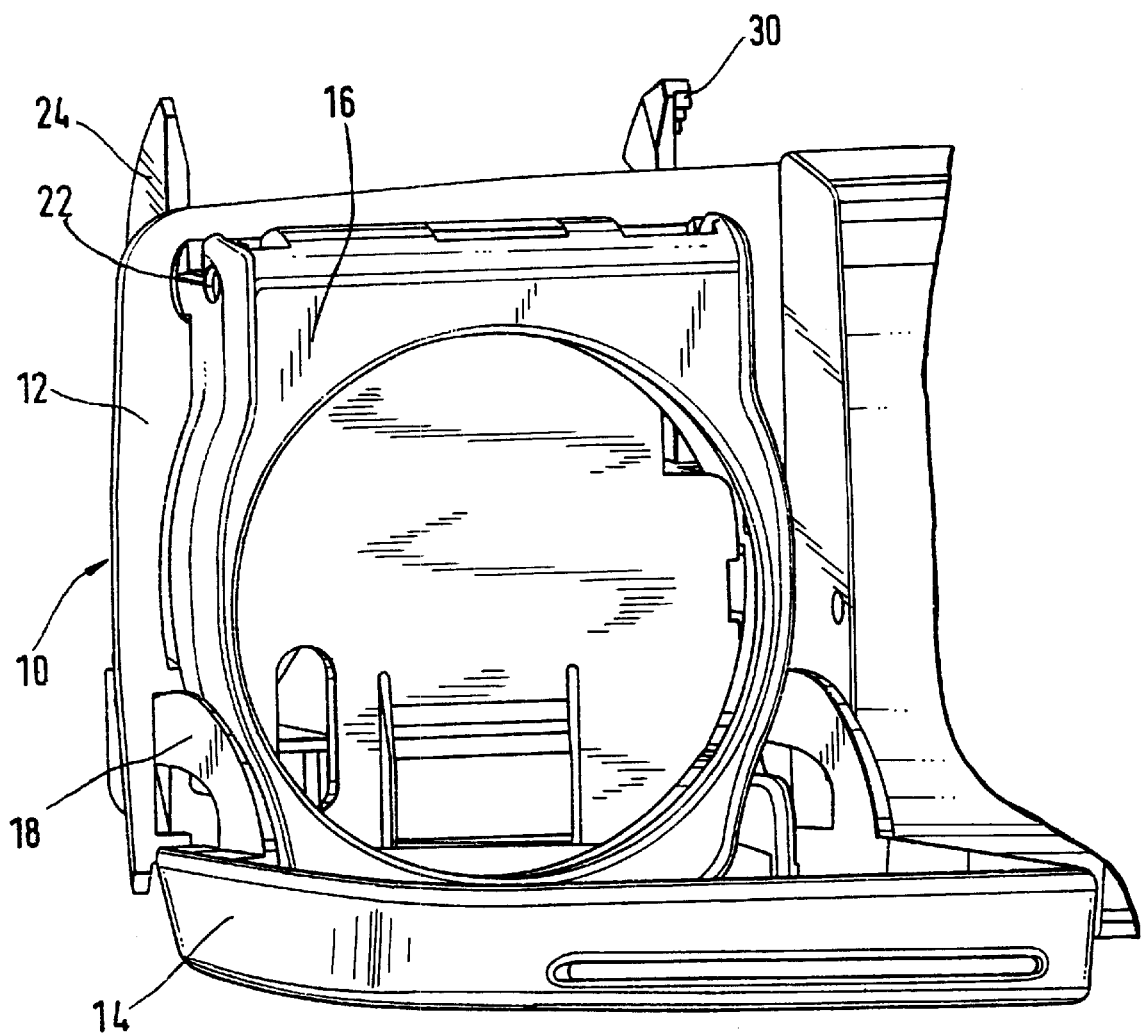
FIG. 3 is a front view of the holder of FIG. 1 with the cover open and with the holding ring in an initial position.
Figure 4:
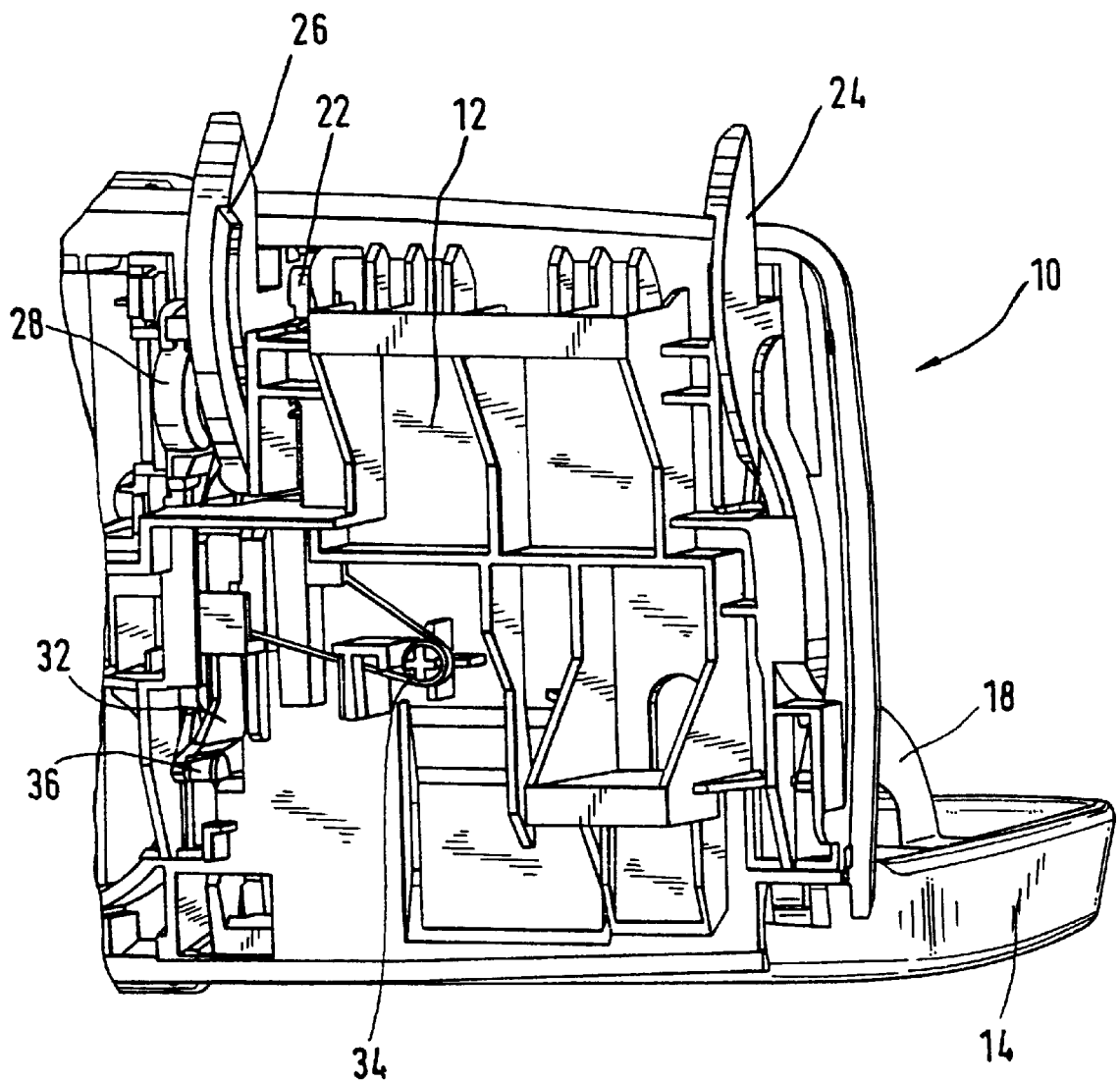
FIG. 4 is a rear view of the holder of FIG. 1 with the cover open and with the holding ring in an initial position.

The holder 10 according to the invention, which is shown in the closed position in FIGS. 1 and 2, for the insertion of a drinks container (not shown), such as, for example, a cup, a beaker or a drinks can, is intended for installation in a dashboard of a motor vehicle (not shown). The holder 10 has a base plate 12 on which there is mounted a dish-shaped cover 14, which in a closed position covers with its concave side the base plate 12 and a holding ring 16 (FIG. 3). The base plate 12 has two pivot pins 17 close to its lower edge which engage in holes provided in the sides of the cover 14. In this way the cover 14 is arranged to pivot downwards about a horizontal pivotal axis (not shown), defined by the pivot pins 17, close to its lower edge into a horizontal, open position, which is shown in FIGS. 3 and 4. Arcuate arms 18 which limit the pivot angle of the cover 14 are provided on the cover 14. These arcuate arms 18 extend through openings in the base plate 12 and limit the angle of pivot of the cover 14 by means of end stops 20.

Figure 5:
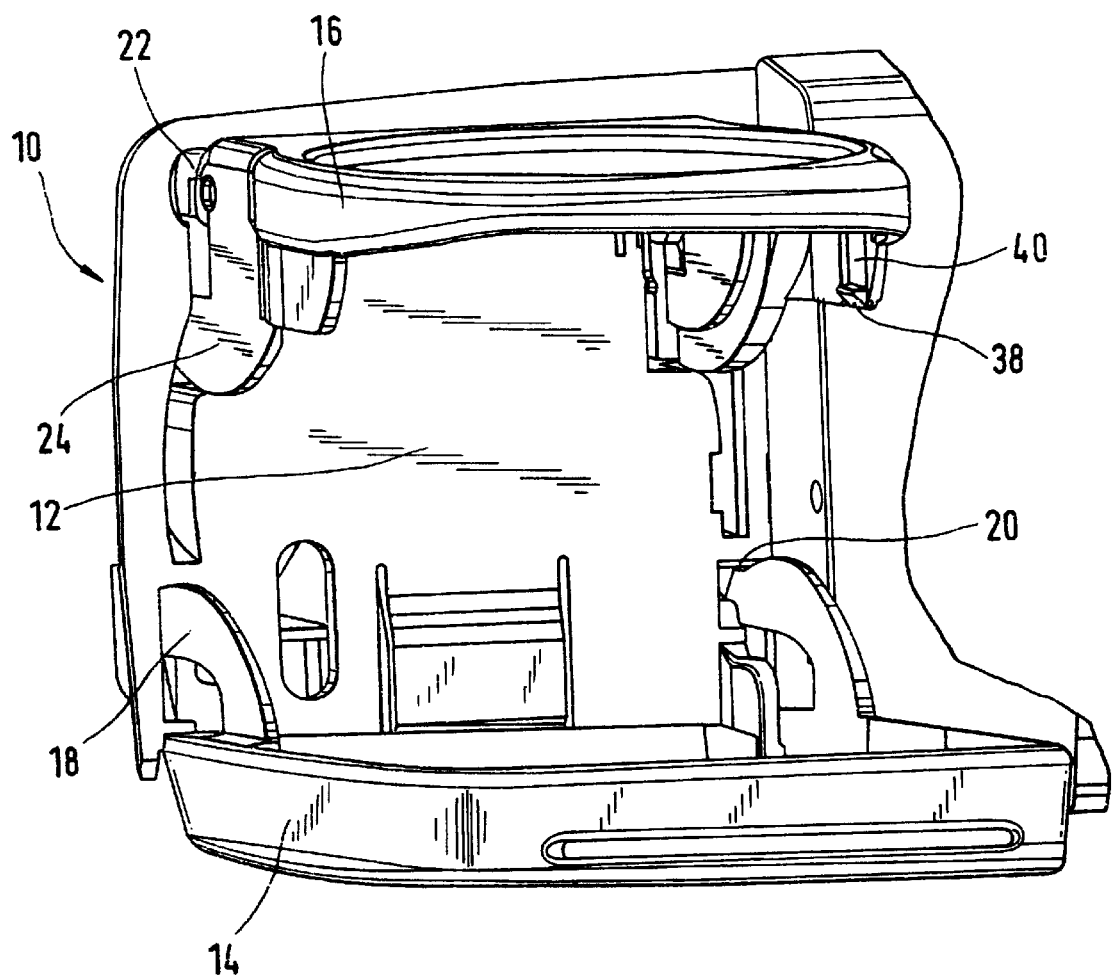
FIG. 5 is a front view of the holder of FIG. 1 fully open.
Figure 6:
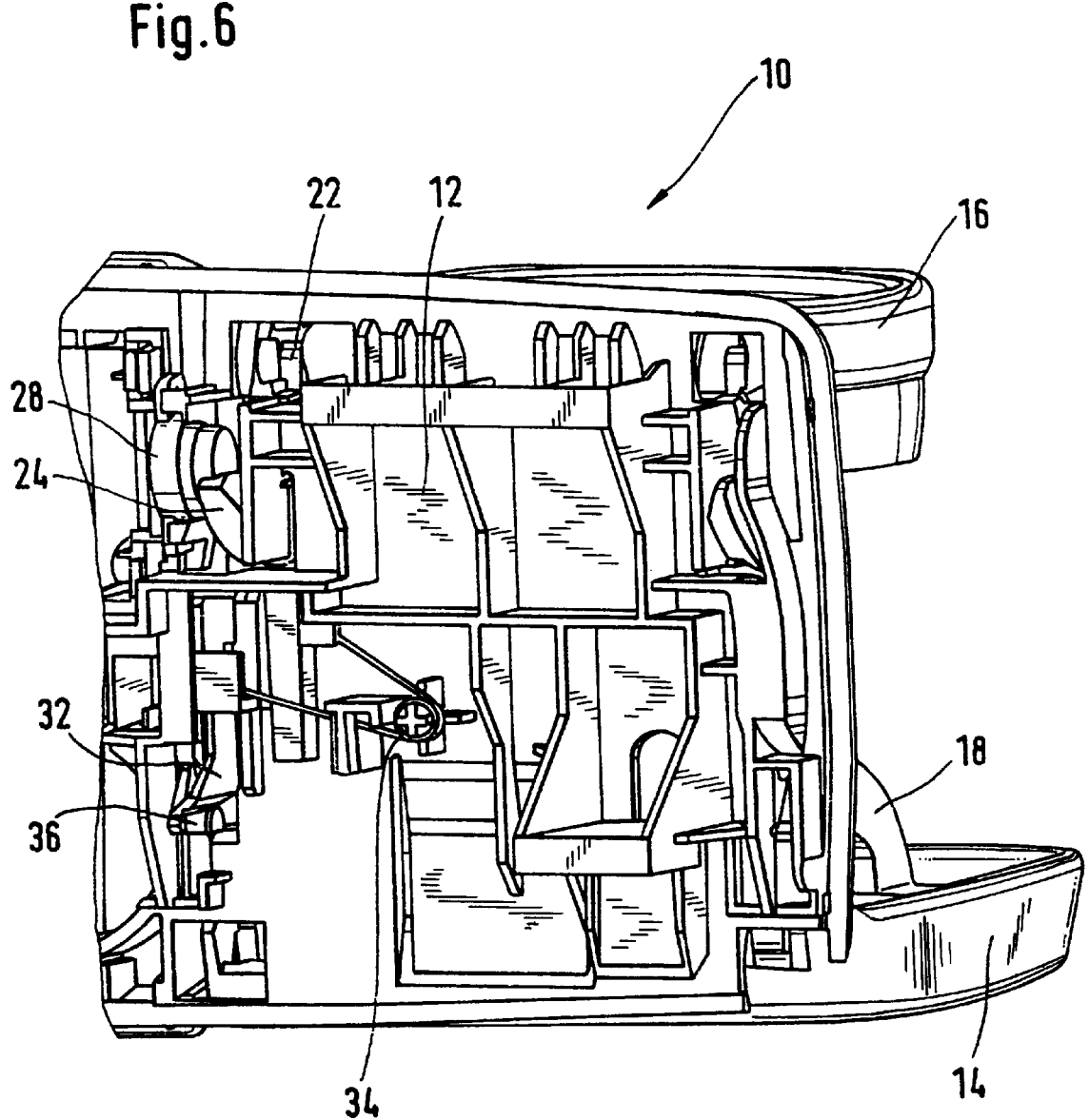
FIG. 6 is a rear view of the holder of FIG. 1 fully open.

The aforementioned holding ring 16 is pivotally connected to the base plate 12 in the region of the upper edge of the base plate 12 by means of a pivot pin connection 22. The pivot pin connection 22 defines a horizontal pivotal axis (not shown) in the region of the upper edge of the base plate 12. The holding ring 16 is arranged to pivot upwards out of the holding position shown in FIG. 3, in which it is located vertically on the base plate 12, into a horizontal holding position shown in FIGS. 5 and 6. The holding ring 16 has two arcuate arms 24 which extend through openings in the base plate 12 and limit the angle of pivot of the holding ring 16 by means of end stops 26.

The holding ring 16 is pivoted from the initial position into the holding position by two leg springs which are not visible in the drawing. A rotation damper 28 known per se damps the pivoting movement of the holding ring 16. A toothed wheel (not visible in the drawing) of the rotation damper 28 meshes with an arcuate toothed rack 30 which is arranged on one of the two arms 24 that im it the angle of pivot of the holding ring 16 and the end of which can be seen in FIGS. 1 an d 3. When the holder 10 is in the open position shown in FIGS. 5 and 6, the holding ring 16 is in a horizontal position above the cover 14 in its open, horizontal position and spaced apart therefrom. A drinks container (not shown) can be inserted into the holding ring 16 to stand upright on the cover 14. The cover 14 forms a receiving dish for any liquid spilling out of the drinks container.

The hold er 10 has a locking device having a slider member 32 which is guided on a rear side of the base plate 12 so as to be displaceable in the vertical direction. The slider member 32 is pressed downwards by a leg spring 34. When the cover 14 is opened, that is to say when the cover 14 is pivoted down from the closed position into the open position, a driver peg 36 mounted laterally on the end of one of the two arms 18 of the cover 14 comes into contact with the slider member 32 (FIGS. 4 and 6) and displaces the slider member 32 upwards against the force of the leg spring 34. The driver peg 36 does not come into contact with the slider member 32 until close to the end of the pivot path of the cover 14, so that the slider member 32 is not displaced until shortly before the cover 14 reaches its open position. As a result of the displacement, the slider member 32 unlocks the holding ring 16, so that the latter pivots out of its initial position and into the holding position. The unlocking of the holding ring 16 is shown in FIG. 7, which shows a side of the slider member 32 remote from view in FIGS. 2, 4 and 6. The slider member 32 cooperates with a detent lug 38 (FIG. 5) which is mounted via a resilient tongue 40 on an underside of the holding ring 16. When the holding ring 16 is in the initial position, the detent lug 38 engages behind an undercut surface 42 of the slider member 32 and thereby locks the holding ring 16 in its holding position against the force of the leg springs (not visible).

The locking position of the detent lug 38 is shown on the left in FIG. 7 and is indicated by reference numeral 38.1. When the cover 14 is opened, one of its arms 18 pivots in the direction of arrow f, so that the driver peg 36 comes into contact with the slider member 32. The driver peg 36 displaces the slider member 32 vertically upwards against the force of the leg spring 34, this direction being indicated by arrow p in FIG. 7, to the left in FIG. 7. As a result of the displacement of the slider member 32, the detent lug 38 of the holding ring 16 comes into contact with an uncoupling surface 44. The uncoupling surface 44 stands perpendicularly to the undercut surface 42 and extends at an angle across the undercut surface 42. The uncoupling surface 44 presses the detent lug 38 to the side and thus downwards from the undercut surface 42, so that the detent lug 38 becomes disengaged from the undercut surface 42. In FIG. 7, the reference numeral 38.2 indicates an intermediate position in which the detent lug 38 is sliding along the uncoupling surface 44. The reference numeral 38.3 in FIG. 7 indicates the position of the detent lug 38 in which it has become disengaged from the undercut surface 42 and the holding ring 16 has thus been unlocked. The holding ring 16 pivots into its holding position under the action of a spring, the detent lug 38 moving away from the slider member 32 in the direction of arrow q in FIG. 7.

In FIG. 7 the slider member 32 is shown in a stationary position, whereas the detent lug 38 moves to the right relative to the slider member 32. In reality, it is the detent lug 38 that is stationary and the slider member 32 moves to the left in FIG. 7.

In order to close the holder 10, the holding ring 16 is pressed downwards into its holding position. As a result, the detent lug 38 passes onto a second undercut surface 46 of the slider member 32, which surface is offset relative to the undercut surface 42 by the width of the uncoupling surface 44. The detent lug 38 engages behind the undercut surface 46 so that the holding ring 16 is locked in its holding position. The cover 14 is then closed. As a result, the arm 18 of the cover 14 moves in a direction opposite to the direction of the arrow f, the driver peg 36 moves away from the slider member 32 and the slider member 32 is displaced by the leg spring 34 in a direction opposite to the direction of arrow p in FIG. 7. When the slider member 32 is displaced in this manner, the detent lug 38 passes from the second undercut surface 46 to the first undercut surface 42 of the slider member 32, that is the holding ring 14 remains locked during the return displacement of the slider member 32. The locking of the holding ring 16 may therefore be effected in any slide position of the slider member 32, and the unlocking is effected by the displacement of the slider member 32 against the force of the leg spring 34 when the cover 14 is opened.

The disclosures in German Patent Applications 298 11 572.7 and 198 40 386.0 of Jun. 29, 1998 and Sep. 4, 1998 are incorporated here by reference. These German Patent Application describe subject matter of the invention disclosed hereinabove and claimed in the claims appended hereinbelow and provide the basis for a claim of priority for the instant invention under 35 U.S.C. 119.

While the invention has been illustrated and described as embodied in a holder for a drinks container, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims:

1. A holder for a drinks container, said holder comprising
   a holding arm (16) movable from an initial position into a holding position and formed to support the drinks container around a circumference of the drinks container when the drinks container is inserted in the holder;
   a cover (14) movable from a closed position into an open position; and
   a locking device (32,38) for locking the holding arm (16) in said initial position and for unlocking the holding arm (16) when said cover is moved into said open position.

2. The holder as defined in claim 1, wherein the cover (14) is arranged in an approximately horizontal position below the holding arm (16) and spaced apart therefrom in said open position thereof.

3. The holder as defined in claim 2, wherein the cover (14) is pivotable downwards into said open position.

4. The holder as defined in claim 1, wherein the holding arm (16) comprises a holding ring which surrounds the drinks container inserted therein in said holding position.

5. The holder as defined in claim 1, wherein the holding arm (16) is pivotable upwards into said holding position.

6. The holder as defined in claim 1, wherein the holding arm (16) is urged into the holding position by spring means.

7. The holder as defined in claim 1, wherein locking device (32,38) includes a detent lug (38) provided on the holding arm (16), the detent lug (38) is formed and arranged so that the detent lug (38) is engaged with the slider member (32) when the holding arm (16) is in the initial position and thereby locks the holding arm (16) in the initial position and so that the detent lug (38) is disengaged from the slider member (32) by displacement of the slider member (32) from the first position into the second position thereof.

8. The holder as defined in claim 7, wherein the slider member (32) has an uncoupling surface (44) on which the detent lug (38) of the holding arm (16) travels when the slider member (32) is displaced from the first position into the second position thereof, whereby the detent lug (38) of the holding arm (16) is disengaged from the slider member (32).

9. A holder for a drinks container, said holder comprising
   a holding arm (16) movable from an initial position into a holding position and formed to hold the drinks container around a circumference of the drinks container when the drinks container is inserted in the holder;
   spring means for urging the holding arm (16) from the initial position into the holding position;
   a cover (14) movable from a closed position into an open position; and
   a locking device (32,38) for locking the holding arm (16) in said initial position and for unlocking the holding arm (16) when said cover is moved into said opening position;
   wherein said locking device (32,38) includes a slider member (32) having a first position and a second position and an uncoupling surface (44), a first undercut surface (42) and a second undercut surface (46), a detent lug (38) provided on the holding arm (16) and formed and arranged so as to be engaged on the first undercut surface (42) of the slider member (32) when the holding arm (16) is in the initial position, thereby locking the holding arm (16) in the initial position, and means (36) for displacing said slider member (32) from the first position to the second position by moving the cover (14) from the closed position to the open position so that said detent lug (38) is moved from the first undercut surface (42) to the uncoupling surface (44), whereby said detent lug (38) is disengaged from said slider member (32) releasing said holding arm (16) so that said holding arm moves into said holding position by action of said spring means.

10. A holder for a drinks container, said holder comprising a holding arm (16) movable from an initial position into a holding position and formed to support the drinks container around a circumference of the drinks container when the drinks container is inserted in the holder;
   a cover (14) movable from a closed position into an open position;
   a locking device (32, 38) for locking the holding arm (16) in said initial position and for unlocking the holding arm (16) when said cover is moved into said open position, said locking device including a slider member (32) having a first position and a second position and means (36) for displacing said slider member (32) from the first position to the second position by opening the cover (14), whereby the holding arm (16) is released or unlocked.

* * * * *